United States Patent Office 3,169,934
Patented Feb. 16, 1965

3,169,934
RIGID BUTYLENE-ETHYLENE-ETHER
TYPE POLYURETHANE FOAMS
Robert F. Dennett and Harold J. Walker, Midland, Mich., assignors to The Dow Chemical Company, Midland, Mich., a corporation of Delaware
No Drawing. Filed Sept. 5, 1961, Ser. No. 135,725
6 Claims. (Cl. 260—2.5)

The present invention relates to polyurethane materials and is more particularly concerned with rigid urethane foams derived from the reaction product of organic diisocyanates and certain hydroxy terminated polyfunctional ethers prepared from the chemical interaction of butylene and ethylene oxides with polyhydroxy compounds and with methods for making the same.

The physical properties desirable in a plastic foam are determined by the intended application. In many situations the extent to which the foam is distorted by heat and moisture is largely determinative of its usefulness. Dimensional stability is especially important in evaluation of foams to be utilized as protective insulation coatings.

It is an object of this invention to provide polyether type polyurethane materials which form a tough, rigid, non-friable, cellular product possessing excellent dimensional stability as characterized by unusual distortion resistance under adverse temperature and moisture conditions. It is also an object to provide such material having desirable insulating properties and good surface adherence over a wide range of surface temperatures. Another object is to provide a process for preparing such polyether type polyurethane materials. Still another object is to provide such a material adaptable to spray foaming surface application techniques. Further objects will become apparent from the following description and claims.

It has now been discovered that polyurethane foams can be formed by the reaction between organic polyisocyanates and certain hydroxy terminated polyfunctional ethers, prepared by chemical combination of butylene and ethylene oxides with a polyol, and that the foams possess properties in accordance with those outlined by the objectives stated above. The high reactivity of these polyhydroxy ethers with respect to the diisocyanates utilized permits spray application of the polyurethane material to vertical surfaces. The tough, non-friable foam produced has good insulating properties, good adherence over a wide range of skin temperature and exhibits excellent dimensional stability. The process of this invention also reduces core charring and polymer degradation which frequently attend previously known processes.

In the process of this invention a polyhydroxy ether, prepared by the successive addition of butylene oxide and ethylene oxide to a polyol, is blended with an amine catalyst, an organo-silicone nucleating and dispersing agent and a blowing agent to form a pre-mixture which is then rapidly mixed with an organic polyisocyanate. The resulting mixture is poured into an open mold where the urethane polymer rapidly foams to a rigid cellular mass. In a variation of the process the pre-mixture is rapidly mixed with a prepolymer comprising the reaction product of an organic polyisocyanate and a polyol prepared by the addition of an alkylene oxide to a polyhydroxy compound. Final mixing may also be accomplished by metering the components to a spray gun of a type commercially available for the purpose.

The polyhydroxy ether to be employed is prepared by the reaction of butylene oxide and ethylene oxide with a polyol or a mixture of polyols such as sucrose or sorbitol or mixtures of at least 55 percent by weight of sucrose or sorbitol and not more than 45 percent by weight of glycerine. Mixtures of 50 to 90 percent by weight of sucrose or sorbitol and from 50 to 10 percent by weight of glycerine are preferred.

In preparing the polyhydroxy ether the alkylene oxides may be employed in the molar ratio of from 2:1 to 1:1 butylene oxide to ethylene oxide, and in total amounts such that the ether product has from about 10 to 20 percent by weight of free hydroxyl groups. It is preferred that the maximum amount of ethylene oxide used be no more than about one mole per available hydroxy group in the polyol and constitute less than about 50 percent of the total moles of alkylene oxide added. Best results are usually obtained when the butylene oxide addition precedes the ethylene oxide addition. The butylene oxide component may consist solely of 1,2-butylene oxide or a mixture of 1,2- and 2,3-butylene oxides.

The polyisocyanate used is preferably tolylene diisocyanate although other polyisocyanates such as m-phenylene diisocyanate, methylenebisphenyl isocyanate, tetramethylene diisocyanate, hexamethylene diisocyanate and similar organic polyisocyanates may be suitably employed.

Any of the nucleating and dispersing agents generally used in making urethane foams may be utilized. Examples of typical agents suitable are described in the bulletin "Rigid Urethane Foams, II, Chemistry and Formulation," by C. M. Barringer, HR–26, Elastomer Chemicals Dept., E. I. Du Pont Co., April 1958. These agents improve the mixing of the components and influence cellular structure of the foamed polymer. The agent used in the following examples was a black copolymer of dimethyl siloxane and polyglycols.

The catalyst employed for the isocyanate-hydroxy ether reaction may include various tin compounds such as stannous octoate, stannous oleate, dibutyl tin laurate, metal salts such as ferric acetylacetonate, and tertiary amines such as tetramethylbutanediamine, triethylenediamine, diethylethanolamine, trimethylamine and dimethylethanolamine.

The antioxidant used may be chosen from a variety of substituted phenolic compounds commonly used for this purpose such as 2,6-ditertiarybutyl-4-methyl phenol.

The blowing agent may similarly be chosen from a wide variety of known blowing agents for urethanes. It is preferable that such agent vaporize at or below the temperature of the foaming mass and a preferred agent is fluorotrichloromethane.

*Example 1*

(A) A Polyol was prepared by the addition reaction of 23 lbs. of butylene oxide followed by reaction of 11 lbs. of ethylene oxide with a mixture of 2 lbs. of glycerine and 8 lbs. of sucrose. The reaction was carried out in a nitrogen atmosphere at pressures between 5 and 50 lbs./in.$^2$ by regulation of the oxide addition rate. The temperature was maintained at 100–110° C. Potassium hydroxide was utilized as a catalyst in the amount of ½ percent by weight of the total reaction mixture. After completion of the reaction the mixture catalyst was neutralized with acid and the salts and volatiles removed. The product was analyzed and found to contain approximately 10.4 percent hydroxyl groups by weight.

(B) A foam was prepared by blending 94.1 parts by weight of the product of (A) above with 0.8 part of an organo-silicone nucleating and dispersing agent, 0.4 part triethylenediamine, 21.6 parts fluorotrichloromethane and rapidly mixing this pre-mixture with 50.0 parts of tolylene diisocyanate. The resulting mixture foamed to a cellular rigid mass in about 87 seconds.

Example 2

(A) A polyol was prepared by the addition reaction of 15 lbs. of butylene oxide followed by reaction of 9 lbs. of ethylene oxide with a mixture of 6 lbs. of glycerine and 9 lbs. of sucrose by procedures similar to those employed in Example 1(A). The product was analyzed and found to contain approximately 16.5 percent hydroxyl groups by weight.

(B) A polyol was prepared by the addition reaction of 1100 lbs. of butylene oxide with a mixture of 230 lbs. of glycerine and 300 lbs. of sucrose by procedures similar to those employed in Example 1(A). The product was analyzed and found to contain approximately 14.6 percent by weight of hydroxyl groups.

(C) A prepolymer, which by analysis contained 26.7 percent by weight of free NCO, was prepared by reacting 34 lbs. of the product of (B) above with 100 lbs. of tolylene diisocyanate under a nitrogen atmosphere and neutral conditions with the temperature maintained below 70° C.

(D) A pre-mixture of 98.5 parts by weight of the product of (A) above, 0.7 part of tetramethylbutanediamine, 0.7 part of an organo-silicone dispersing agent and 37.3 parts of fluorotrichloromethane was rapidly mixed with 180.0 parts of the product of (C) above. The resulting mixture was poured into an open mold and foamed to a rigid cellular mass having the properties:

| | |
|---|---|
| Density (lbs./ft.$^3$) | 2.26 |
| Percent vol. change [1] | +10.0 |
| Percent closed cells | 95.9 |
| Initial K factor (B.t.u./in./ft.$^2$/hr./° F.) | 0.122 |

[1] The volume change was measured after 6 days' exposure to 100 percent relative humidity at a temperature of 158° F.

Example 3

(A) A polyol was prepared by the addition reaction of 485 lbs. of butylene oxide followed by reaction of 300 lbs. of ethylene oxide with a mixture of 200 lbs. of glycerine and 300 lbs. of sucrose by procedures similar to those employed in Example 1(A). The product was analyzed and found to contain approximately 17.1 percent by weight of hydroxyl groups.

(B) A polyol was prepared by the addition reaction of 975 lbs. of butylene oxide with a mixture of 200 lbs. of glycerine and 300 lbs. of sucrose by procedures similar to those employed in Example 1(A).

(C) A prepolymer, which by analysis contained 29.5 percent by weight of free NCO, was prepared by reacting 41.5 lbs. of the product of (B) about with 160 lbs. of tolylene diisocyanate by procedures similar to those employed in Example 2(C).

(D) Two mixtures, one containing 100.0 parts by weight of the product of (C) above and 0.5 part of an organosilicone agent and the other containing 70.0 parts of the product of (A) above, 25.5 parts of fluorotrichloromethane, 0.7 part triethylenediamine, 0.4 part of stannous octoate and 3.4 parts of an antioxidant, were separately metered through a spray head and mixed by spraying converging streams onto a large storage tank. A rigid cellular mass rapidly formed to give a very good insulating cover.

Example 4

(A) A polyol was prepared by the addition reaction of 635 lbs. of butylene oxide followed by reaction of 210 lbs. of ethylene oxide with a mixture of 200 lbs. of glycerine and 300 lbs. of sucrose by procedures similar to those employed in Example 1(A). The product was analyzed and found to contain approximately 15.8 percent by weight of hydroxyl groups.

(B) 40.25 parts by weight of the product of (A) above, pre-mixed with 12.84 parts of fluorotrichloromethane, 1.25 parts of tetramethylbutanediamine, 1.00 part of an organosilicone agent and 0.15 part of the antioxidant 2,2-ditertiarybutyl-4-methyl phenol, were mixed with 45.5 parts of crude tolylene diisocyanate using a metering device and a mixing head of a type commercially available for large scale foam production. The resulting mixture was rapidly dispensed into a large mold where foaming took place in 35 seconds. The foam obtained possessed excellent physical properties. The average values of five foams prepared in accordance with this example are listed below in column (1).

For purposes of comparison a urethane foam was prepared as in Example 4 except that the polyol was the reaction product of 1.0 mole of propylene oxide per hydroxy group with the glycerine-sucrose mixture. The physical properties of this foam are listed below in column (2).

| | (1) | (2) |
|---|---|---|
| Density (lbs./ft.$^3$) | 2.52 | 2.13 |
| Percent vol. change [a] | +4.3 | +22.9 |
| Percent closed cells | 97.8 | 95.6 |
| Initial K factor (B.t.u./in./ft.$^2$/hr./° F.) | 0.128 | 0.135 |

[a] (The volume change was measured after prolonged exposure to 100 percent relative humidity at a temperature of 158° F.)

Similar results are obtained by substituting sorbitol for the sucrose employed in the preceding examples.

The previous examples are not to be construed as limiting since various modifications may be made in the present invention without departing from the spirit or scope thereof.

We claim:

1. A rigid, cellular, polyether polyurethane composition comprising the foamed reaction product of (A) a polyhydroxy ether comprising the condensation reaction product of a mixture of at least 55 percent by weight of a polyol selected from the group consisting of sorbitol and sucrose, and not more than 45 percent by weight of glycerine, first with butylene oxide and then with ethylene oxide, wherein the molar ratio of butylene oxide to ethylene oxide is within the range of 2:1 to 1:1 and in total amounts such that the condensation product contains from about 10 percent to about 20 percent by weight of hydroxyl groups, and (B) an organic polyisocyanate; said reaction being conducted in the presence of a dispersing agent, a catalyst and a volatile fluorine-containing polyhalohydrocarbon blowing agent.

2. A composition as defined in claim 1 wherein the polyhydroxy ether comprises the condensation reaction product of a mixture of sucrose and glycerine with butylene oxide and ethylene oxide.

3. A rigid, cellular, polyether polyurethane composition as defined in claim 1 wherein the polyhydroxy ether comprises the condensation reaction product of a mixture of 80 percent by weight of sucrose and 20 percent by weight of glycerine with butylene oxide and with ethylene oxide.

4. A composition as defined in claim 1 wherein the polyhydroxy ether comprises the condensation reaction product of a mixture of 60 percent by weight of sucrose and 40 percent by weight of glycerine with butylene oxide and with ethylene oxide.

5. A composition as defined in claim 1 wherein the organic polyisocyanate is tolylene diisocyanate.

6. In the process of making a rigid, cellular, polyether polyurethane material by the reaction of an organic polyisocyanate with a polyhydroxy ether in the presence of a dispersing agent, a volatile fluorine-containing polyhalohydrocarbon blowing agent and a catalyst, the improvement of using as the polyhydroxy ether a composition comprising the condensation reaction product of a mixture of at least 55 percent by weight of a polyol selected from the group consisting of sorbitol and sucrose, and not more than 45 percent by weight of glycerine, first with butylene oxide and then with ethylene oxide, wherein the molar ratio of butylene oxide to ethylene oxide is within the range of 2:1 to 1:1 and in total amounts such that the condensation product contains from about 10 percent to about 20 percent by weight of hydroxyl groups.

No references cited.